United States Patent
Sivakumar et al.

(10) Patent No.: US 11,343,315 B1
(45) Date of Patent: May 24, 2022

(54) SPATIO-TEMPORAL SOCIAL NETWORK BASED MOBILE KUBE-EDGE AUTO-CONFIGURATION

(71) Applicant: INTERNATIONAL BUSINESS MACHINES CORPORATION, Armonk, NY (US)

(72) Inventors: Gandhi Sivakumar, Bentleigh (AU); Vijay Ekambaram, Chennai (IN); Padmanabha Venkatagiri Seshadri, Mysore (IN); Anand Shantilal Borse, Glen Huntly (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/101,419

(22) Filed: Nov. 23, 2020

(51) Int. Cl.
*H04L 29/08* (2006.01)
*H04L 67/1097* (2022.01)
*H04L 43/10* (2022.01)

(52) U.S. Cl.
CPC .......... *H04L 67/1097* (2013.01); *H04L 43/10* (2013.01)

(58) Field of Classification Search
CPC .......................... H04L 67/1097; H04L 43/10
See application file for complete search history.

(56) References Cited

U.S. PATENT DOCUMENTS

| | | | |
|---|---|---|---|
| 6,931,630 B1 | 8/2005 | Cotner | |
| 8,713,562 B2 | 4/2014 | Dain | |
| 9,122,562 B1 | 9/2015 | Stickle | |
| 9,983,795 B1 * | 5/2018 | Naamad | ................ G06F 3/0629 |
| 10,110,495 B1 * | 10/2018 | Sabella | ............. H04M 15/8044 |
| 10,412,154 B2 | 9/2019 | Vyas | |
| 10,608,911 B2 | 3/2020 | Nickolov | |

(Continued)

FOREIGN PATENT DOCUMENTS

| | | |
|---|---|---|
| CN | 110633144 A | 12/2019 |
| CN | 111082997 A | 4/2020 |

(Continued)

OTHER PUBLICATIONS

Alon et al., "code2vec: Learning Distributed Representations of Code", Proc. ACM Program., Lang., vol. 3, No. POPL, Article 40., Jan. 2019, pp. 1-29.

(Continued)

*Primary Examiner* — Viet D Vu
(74) *Attorney, Agent, or Firm* — John Noh

(57) ABSTRACT

A method, a computer program product, and a computer system determine a kube-edge pod configuration. The method includes determining mobile devices in a coverage area utilizing a cloud service. The method includes receiving polling data from the mobile devices that include bid data indicative of a respective cost and a respective resource availability for each of the mobile devices operating as an edge device for the cloud service. The method comprises includes coupling information for the mobile devices indicative of whether at least two of the mobile devices are to be considered coupled such that the coupled mobile devices have a coupled cost and a coupled resource availability. The method includes determining a utility score of the coverage area based on the bid data and the coupling information and selecting a data storage deployment scheme for pods of the cloud service based on the utility score.

18 Claims, 5 Drawing Sheets

(56) References Cited

U.S. PATENT DOCUMENTS

| | | | |
|---|---|---|---|
| 2013/0166712 A1* | 6/2013 | Chandramouli | H04L 67/10 709/223 |
| 2020/0320397 A1* | 10/2020 | Liu | G06F 9/4856 |
| 2020/0322233 A1* | 10/2020 | Gao | H04L 41/5019 |
| 2020/0351900 A1* | 11/2020 | Zhang | H04L 12/14 |
| 2021/0117860 A1* | 4/2021 | Ergen | G06N 20/00 |
| 2021/0160316 A1* | 5/2021 | Guyer | G06F 3/0604 |

FOREIGN PATENT DOCUMENTS

| | | |
|---|---|---|
| CN | 111427822 A | 7/2020 |
| EP | 36178791 A | 3/2020 |

OTHER PUBLICATIONS

Anonymous. "A system and method of adaptive testing scope recommendation with cognitive learning system." Published Jan. 24, 2017. Published by IP.com. https://priorart.ip.com/IPCOM/000248952, 7 pages.

Anonymous. "CI-CD for Monorepo on Kubernetes." Accessed Jul. 16, 2020, Published by Infracloud. https://www.infracloud.io/monorepo-ci-cd-helm-kubernetes/, 7 pages.

Anonymous. "Updating a Deployment." Accessed Jul. 16, 2020, https://cloud.google.com/deployment-manager/docs/deployments/updating-deployments, pp. 1-10.

Bernstein, "Containers and Cloud: From LXC to Docker to Kubernetes", Cloud Tidbits Column, Sep. 2014, IEEE Cloud Computing, http://www.ce.uniroma2.it/courses/sdcc1617/articoli/bernstein_cc2014.pdf, pp. 81-84.

Bila et al., "Leveraging the Serverless Architecture for Securing Linux Containers", 2017 IEEE 37th International Conference on Distributed Computing Systems Workshops, http://niltonbila.com/pub/Bila-WoSC17.pdf, pp. 401-404.

Boyd, "Disruption: The MEC, 5G Impact on the Computing Landscape", Jan. 4, 2018, sdxcentral, https://www.sdxcentral.com/edge/definitions/mec-5g/, pp. 1-3.

Bruch et al., "Learning from Examples to Improve Code Completion Systems", HAL Archives-ouvertes, Proceedings of the 7th Joint Meeting of the European Software Engineering Conference and the ACM Symposium on the Foundations of Softwre Engineering, 2009, Amsterdam, Netherlands, pp. 1-11.

Ding, "KubeEdge v1.2 is out now", Last updated on Feb. 16, 2020, https://kubeedge.io/en/blog/release-v1.2/, pp. 1-3.

Dupont et al., "Edge computing in IoT context: horizontal and vertical Linux container migration", Conference: 2017 Global Internet of Things Summit (GIoTS), http://corentindupont.info/bibliography/files/GIOTS17.pdf, pp. 1-8.

Engler et al., "Bugs as Deviant Behavior: A General Approach to Inferring Errors in Systems Code", 2001, ACM ISBM 1-58113-389-8 Jan. 1, 2010, pp. 1-16.

Grobmann et al., "Monitoring Container Services at the Network Edge", 2017 29th International Teletraffic Congress, https://www.researchgate.net/profile/Marcel_Grossmann/publication/320367150_Monitoring_Container_Services_at_the_Network_Edge/links/59e9e775aca272bc42b73a5a/Monitoring-Container-Services-at-the-Network-Edge.pdf, pp. 1-5.

Kumar, "KubeEdge, a Kubernetes Native Edge Computing Framework", Mar. 19, 2019, https://kubernetes.io/blog/2019/03/19/kubeedge-k8s-based-edge-intro/, pp. 1-6.

Medel et al., "Characterising Resource Management Performance in Kubernetes", 2018, Online research @ Cardiff, http://orca.cf.ac.uk/110691/1/kperform-journal-v4.pdf, 26 pages.

Mell et al., "The NIST Definition of Cloud Computing", National Institute of Standards and Technology, Special Publication 800-145, Sep. 2011, pp. 1-7.

Nangare, "Powering Edge With Kubernetes: A Primer", calsoft, Informative Articles on Emerging data Center Technologies, https://blog.calsoftinc.com/2019/08/powering-edge-with-kubernetes-a-primer.html, Posted on Aug. 14, 2019, 6 pages.

Pham et al., "A Survey of Multi-Access Edge Computing in 5G and Beyond: Fundamentals, Technology Integration, and State-of-the-Art", Prepared for IEEE Communications Surveys and Tutorials, arXiv:1906.08452v1 [cs.NI] Jun. 20, 2019, https://www.researchgate.net/publication/333915704, pp. 1-59.

Sugiyama, "Kubernetes Native Infrastructure and Operator Framework for 5G Edge Cloud Computing", Open Source Summit, the Linux Foundation, OpenShift/K8s on OpenStack NFV session@OSS2018, https://events19.linuxfoundation.org/wp-content/uploads/2019/07/OSS2019-HS-k8sNativeInfra-OperatorFor5Gedge.pdf, 32 pages.

Xiong et al., "Extend Cloud to Edge with KubeEdge", 2018 Third ACM/IEEE Symposium on Edge Computing, https://ieeexplore.ieee.org/document/8567693, pp. 373-377.

International Search Authority—Notification of Transmittal of the International Search Report and the Written Opinion of the International Searching Authority, file reference F21WO610, International Application No. PCT/CN2021/125326, International filing date: Oct. 21, 2021, dated Jan. 19, 2022, Date of completion of the international search: Dec. 16, 2021, pp. 1-10.

* cited by examiner

SPATIO-TEMPORAL SOCIAL NETWORK BASED MOBILE KUBE-EDGE AUTO-CONFIGURATION

BACKGROUND

The exemplary embodiments relate generally to kube-edge computing, and more particularly to determining a kube-edge pod configuration to enable high coverage and availability with minimal incentives.

In a cloud environment, edge computing enables processing and/or storage of data to be provided closer to the devices where such operations are being performed. Accordingly, edge computing eliminates the need for data that is to be processed and/or stored to be transmitted to a central location (e.g., a central cloud server) which may be physically located a significant distance away from the devices. Although this configuration may not provide a substantial change to the services being provided on an individual device perspective, the explosion of Internet of Things (IoT) and use of such devices exponentially increases requirements in utilizing the cloud services (e.g., increase in latency resulting in lower quality, bandwidth costs, etc.). Therefore, edge computing may be provided to alleviate such issues.

Multi-access edge computing (MEC) provides an approach where cloud-computing capabilities and an IT service environment are provided at the edge of the network. MEC provides an ecosystem in which applications and services towards devices may be flexibly and rapidly deployed. 5G is the next generation of broadband cellular networks that purportedly allows for increased communication rates. MEC has implementations for various networks and 5G has been expanding as service providers adopt the most current and technologically advanced system for their customers. However, MEC and 5G are considered disrupting technologies on their own but, when combined, will become a powerful force in the world of computing. The emergence of 5G networking capabilities will increase the number of connected devices on a network, which spurs the need for edge computing to help distribute networking demands. Applications that rely heavily on a consistent network connection, rapid deployment, and low latency include burgeoning technologies such as artificial intelligence (AI), IoT, virtual reality (VR), augmented reality (AR), etc. MEC and 5G networking together allow for the simultaneous usage of a massive number of connected technologies without incurring network outages due to traffic bottlenecks. However, current edge deployments may not be properly configured to dynamically address providing the edge services in various coverage areas.

SUMMARY

The exemplary embodiments disclose a method, a computer program product, and a computer system for determining a kube-edge pod configuration. The method comprises determining mobile devices in a coverage area of a mobile environment, the mobile devices utilizing a cloud service. The method comprises receiving polling data from the mobile devices. The polling data includes bid data indicative of a respective cost and a respective resource availability for each of the mobile devices operating as an edge device for the cloud service. The method comprises determining coupling information for the mobile devices. The coupling information is indicative of whether at least two of the mobile devices are to be considered coupled such that the coupled mobile devices have a coupled cost and a coupled resource availability. The method comprises determining a utility score of the coverage area based on the bid data and the coupling information. The method comprises selecting a data storage deployment scheme for pods of the cloud service based on the utility score.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
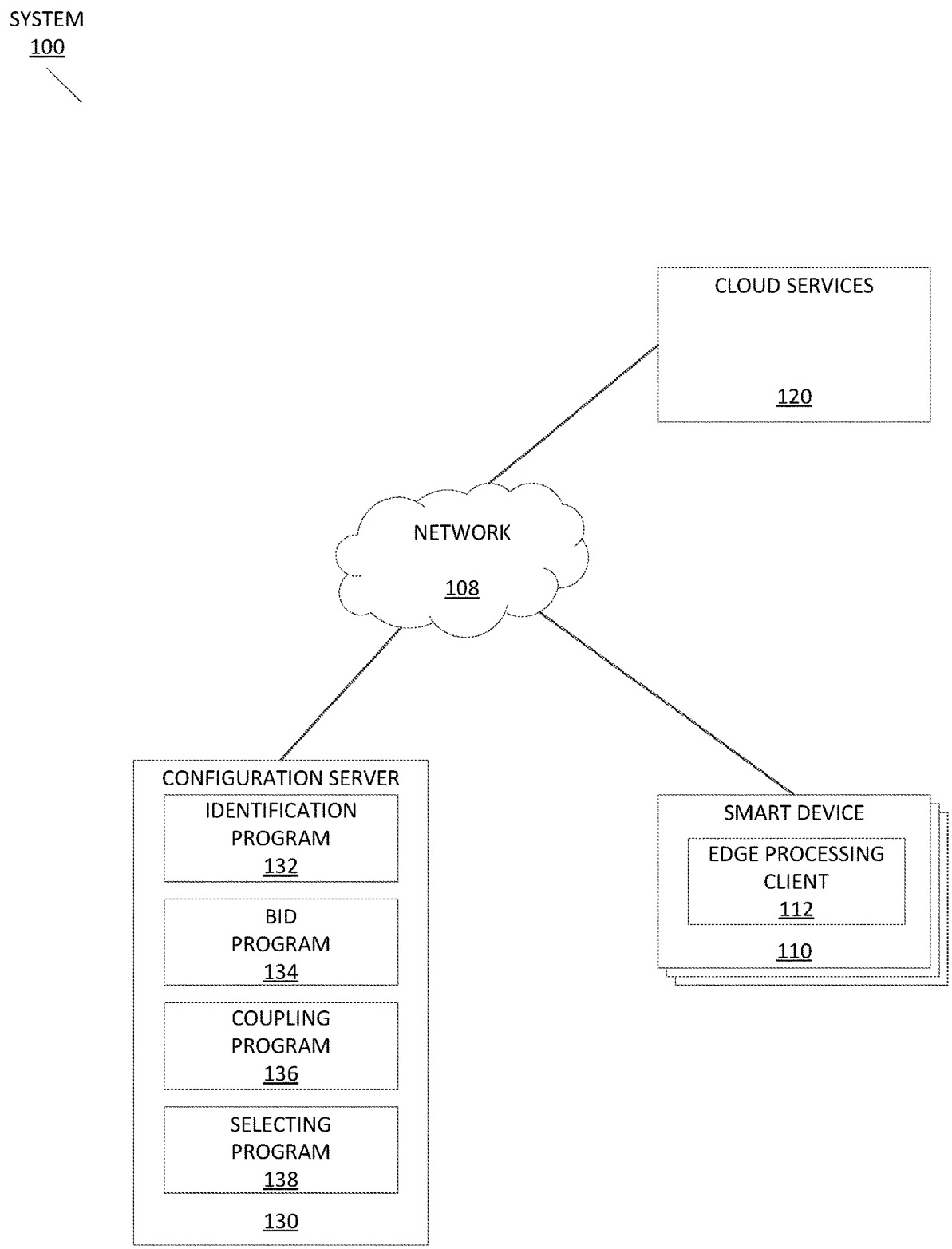
FIG. 1 depicts an exemplary schematic diagram of a kube-edge configuration system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for determining a kube-edge configuration. As will be described in further detail below, the exemplary embodiments may provide a mechanism to auto-configure a kube-edge pod configuration in a coverage area of a mobile environment where mobile devices may be present. The exemplary embodiments may determine the kube-edge pod configuration according to a storage deployment scheme such as between a stateful deployment or a stateless deployment dynamically by considering the varying and dynamic conditions due to the mobile nature of the devices in the coverage area. Key benefits of the exemplary embodiments may include dynamically determining the configuration and departing from a static form of kube-edge deployment that may operate seamlessly in mobile environments. Detailed implementation of the exemplary embodiments follows.

Kube-edge deployments in a cloud environment are generally static in nature. Specifically, with regard to a pod configuration, the kube-edge deployment may have a configuration that is fixed and used for the pods of the Kubernetes. For example, the storage across pods may be selected to be shared. In another example, the storage across pods may be selected to be individual for pods. The kube-edge deployment in conventional systems substantially fixes one of these configurations to be used by the Kubernetes. However, developments in, for example, Internet of Things (IoT) has raised a need for mobile based deployments that enable kube-edge based application program interfaces (APIs) in movable vehicles that lead to faster 5G networks in vehicular networks or enable better coverage to remote areas through vehicular networks. Accordingly, the fixed or static approach to kube-edge deployments have drawbacks and do not provide a seamless operation in mobile environments.

Conventional approaches in deployment kube-edge systems relate to various mechanisms that purportedly improve how kube-edge operates. For example, a conventional approach describes how mobile edge computing (MEC) may be integrated with 5G technology. In another example, a conventional approach describes fusion management of an edge cloud where a kube-edge program meets the needs of resource limited edge nodes being managed into a central Kubernetes system. In a further example, a conventional approach describes a Kubernetes native infrastructure and operator framework for 5G edge cloud computing. In yet another example, conventional approaches describe extending cloud or a Kubernetes ecosystem from cloud to edge. However, these conventional approaches do not provide any mechanism to leverage mobility patterns of mobile edge nodes and a communication interaction with peer edge nodes to generate a service-level-objective conforming kube-edge pod configurations that span a spectrum of stateless-to-stateful options. These conventional approaches further do not consider standard parameters with respect to resource and cost. Accordingly, the conventional approaches do not understand the coupling between edge devices from a spatio-temporal social network analysis and leverage this information to provide a better trade-off between stateful vs stateless deployments in kube-edges leading to better trade-off decisions.

The exemplary embodiments are configured to address mobile environments and coverage areas involving mobile environments that have varying resources based on the mobile edge device availability and respective configurations. Therefore, the exemplary embodiments are directed to providing an approach in which a same kube-edge pod configuration that does not apply generically to add mobile environments. In mobile environments, for a given location or coverage area, different mobile devices may be available. Different devices may have different costs and resources associated therewith. Furthermore, availability time for these devices may constantly be changing as a mobile device that is present in a coverage area at one moment may be absent in another moment. Therefore, a plain static selection of devices do not always provide an optimal solution. The exemplary embodiments utilize a dynamic approach in which a more sophisticated analysis is used. The exemplary embodiments therefore provide a selection between stateful and stateless deployments that ordinarily include complex decisions due to the mobile nature of the mobile devices. In this manner, the exemplary embodiments are configured to discover the optimal kube-edge pod configuration for a given mobile environment to enable high coverage and availability with minimal incentives. The exemplary embodiments are also configured to discover the optimal kube-edge pod configuration when multiple devices are polling for at the same time.

The exemplary embodiments are described with particular reference to kube-edge and pod configurations that are associated with Kubernetes in a cloud environment. However, the exemplary embodiments being directed to such an arrangement is only for illustrative purposes. The exemplary embodiments may be utilized and/or modified to be used in any networking environment in which an edge system may be utilized and the features of the exemplary embodiments may be properly applied to determine an optimal configuration that suits the coverage area being processed. The exemplary embodiments are also described with regard to stateful and stateless deployments associated with storage functionalities for the pods. However, the use of the stateful and stateless deployments as well as the storage functionality is only illustrative. The exemplary embodiments may be utilized and/or modified for other configurations that may be directed toward other functionalities.

FIG. 1 depicts a kube-edge configuration system 100, in accordance with the exemplary embodiments. According to the exemplary embodiments, the kube-edge configuration system 100 may include one or more smart devices 110, cloud services 120, and a configuration server 130, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted. The kube-edge configuration system 100 represents a communication arrangement in which the components thereof are configured to exchange data with one another in a direct or indirect manner.

In the exemplary embodiments, the network 108 may be a communication channel capable of transferring data between connected devices. Accordingly, the components of the kube-edge configuration system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the kube-edge configuration system 100 that do not utilize the network 108.

In the exemplary embodiments, the one or more smart devices 110 may include a edge processing client 112, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the smart device 110 is shown as a single device, in other embodiments, the smart device 110 may be comprised of a cluster or plurality of computing devices, in a modular manner, etc., working together or working independently. The smart device 110 is described in greater detail as a hardware implementation with reference to FIG. 3, as part of a cloud implementation with reference to FIG. 4, and/or as utilizing functional abstraction layers for processing with reference to FIG. 5.

The smart devices 110 may represent any mobile device that may be part of a mobile environment that may be present in a predefined coverage area. The coverage areas may be predefined in a variety of manners based on various factors (e.g., physical area boundary, load factors, etc.). With regard to the kube-edge aspect of the mobile environment directed toward a cloud, the smart devices 110 may also represent edge devices configured to provide edge processing. In this manner, the smart devices 110 may also include edge gateways within the edge-computing infrastructure.

In the exemplary embodiments, the edge processing client 112 may act as a client in a client-server relationship and may be a software, hardware, and/or firmware based application capable of exchanging data utilized in determining a kube-edge pod configuration for a coverage area in a mobile environment particularly where the smart device 110 is located, the data being exchanged via the network 108. In embodiments, the edge processing client 112 may exchange polling data and other associated information, and utilize various wired and/or wireless connection protocols for data transmission and exchange associated with data used for modifying a version of an application, including Bluetooth, 2.4 gHz and 5 gHz internet, near-field communication, Z-Wave, Zigbee, etc.

The edge processing client 112 may be configured to communicate polling data. In an exemplary embodiment, upon entering a coverage area, the edge processing client 112 may generate polling data that is transmitted to, for example, the configuration server 130. In this exemplary embodiment, the smart device 110 may include network operations in which communications with network components (e.g., association processes, handshakes, roaming, etc.) may include information as to whether the smart device 110 has entered a new coverage area as well as an identity of the coverage area. In another exemplary embodiment, the edge processing client 112 may receive a request for the polling data, generating the polling data, and transmit a response including the polling data to, for example, the configuration server 130. In this exemplary embodiment, the smart device 110 may have been identified as being in a coverage area for which the features of the exemplary embodiments are to be provided.

The edge processing client 112 may generate the polling data to include various types of information. For example, the polling data may include availability information of the smart device 110 to be an edge device, location information of the smart device 110, movement information of the smart device 110, etc. as well as technical parameters or information of the smart device 110 that is generating the polling data. The technical information may include available mobile resources (e.g., CPU, disk space, etc.), cost associated with being used as an edge device, etc. The polling data may also be used to ascertain other information about the smart device 110. For example, the location information and the movement information may be used to determine mobile availability time that the smart device 110 remains in the coverage area being processed. The edge processing client 112 may provide any information that is to be included in the polling data such that an optimal determination of the kube-edge pod configuration may be performed.

The cloud services 120 may represent any cloud service provider and the services that are rendered for users associated with the smart devices 110. Those skilled in the art will understand the various components, devices, connections, etc. that may be involved in providing the cloud services 120. For example, the cloud services 120 may utilize cloud computing where a network of remote servers and other network devices hosted through a network (e.g., Internet) may provide storage, management, processing, etc. of data in contrast to a local server or network maintained by an entity. The exemplary embodiments may be utilized and/or modified to be used with the cloud services 120 and may encompass any cloud service that is available to the users of the smart devices 110.

The cloud services 120 may have various characteristics associated with a cloud. For example, in providing the cloud services 120, the cloud may include Kubernetes that define building blocks that provide mechanisms configured to deploy, maintain, scale, etc. a plurality of applications based on various metrics. Those skilled in the art will understand the various technical aspects associated with Kubernetes and their function in the cloud. In another example, the cloud may include pods that group containerized components where each container functionally decouples applications from underlying host infrastructure components. The pods may comprise one or more containers that may be co-located on a host machine with the capability of sharing resources. With regard to kube-edge systems such as those for which the exemplary embodiments may be applied, the pods may be configured in a stateful or a stateless deployment in which storage of data may be for individual pods or shared across a plurality of pods, respectively.

In the exemplary embodiments, the configuration server 130 may include an identification program 132, a bid program 134, a coupling program 136, and a selecting program 138, and act as a server in a client-server relationship with the edge processing client 112. The configuration server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the configuration server 130 is shown as a single device, in other embodiments, the configuration server 130 may be comprised of a cluster or plurality of computing devices, working together or working independently. The configuration server 130 is described in greater detail as a hardware implementation with reference to FIG. 3, as part of a cloud implementation with reference to FIG. 4, and/or as utilizing functional abstraction layers for processing with reference to FIG. 5.

According to the exemplary embodiments, the configuration server 130 may discover and enable a kube-edge pod configuration with a focus on stateful vs stateless deployment for a given mobile environment which enables high coverage and availability with minimal incentives in the context of multi-device availability and social-network consideration in the mobile environment.

In the exemplary embodiments, the identification program 132 may be a software, hardware, and/or firmware application configured to select a coverage area in a mobile environment and determine which of the smart devices 110 are located in the selected coverage area. As described above with regard to the edge processing client 112, the identification program 132 may poll the smart devices 110 that are located in the selected coverage area and receive polling data in an active or passive manner. For example, in an active manner, when the coverage area has been selected, the identification program 132 may poll the coverage area and request that devices provide polling data. The identification program 132 may generate a polling signal that is broadcast in the selected coverage area such that each of the smart devices 110 in the selected coverage area receives the polling signal. Alternatively, the identification program 132 may receive information from network components that provide identifications of the smart devices 110 for which the identification program 132 may selectively transmit a polling signal to these smart devices 110. In another example, in a passive manner, the identification program 132 may be assigned one or more coverage areas in the mobile environment. Each time that the smart devices 110 enter the coverage area assigned to the identification program 132, the identification program 132 may receive polling data from the smart devices 110. In such a scenario, the identification program 132 may passively broadcast the polling signal (e.g., continuously, at intermittent time intervals, etc.).

In the exemplary embodiments, the bid program 134 may be a software, hardware, and/or firmware application configured to process the polling data that includes bid information from the smart devices 110 in the coverage area of the mobile environment. As described above, the polling data may include bid information that includes various types of inputs. For example, the polling data may include information related to the smart device 110 including availability information, location information, movement information, technical parameters, etc. The availability information may indicate whether the smart device 110 is available to be used as an edge device for the kube-edge pod configuration. The location information may indicate a physical location within the coverage area. The technical parameters may provide various technical characteristics of the smart device 110 (e.g., model, processor type, graphics card, etc.). The bid information included in the polling data (e.g., when the smart device 110 is available as an edge device) may include information related to available resources and expected costs in offering the service (e.g., of being an edge device). For example, the bid information may include mobile resources (e.g., CPU, disk space, etc.), cost (e.g., processing costs, financial costs, etc.), min and max resources required for the service (e.g., one of the cloud services 120), mobile availability time (e.g., a duration that the smart device 110 remains in the coverage area, a duration that the smart device 110 is available to be an edge device for any other reason, etc.).

Using the polling information and the bid data, the bid program 134 may generate a utility score based on the respective costs and resources of the smart devices 110 in the coverage area. The utility score may be directed to the coverage area that incorporates the various information of the smart devices in the coverage area. The utility score may be indicative of whether to utilize a stateless deployment for the kube-edge pod configuration (e.g., storage is shared across the pods) or a stateful deployment for the kube-edge pod configuration (e.g., storage is individual for each pod). The bid program 134 may generate the utility score along a range of values and utilize a utility threshold where a utility score on one side of the utility threshold is indicative of the stateless deployment and a utility score on the other side of the utility threshold is indicative of the stateful deployment.

In an exemplary implementation, the smart devices 110 may be substantially static in the coverage area such that the resources of each of the smart devices 110 are relatively substantial, the costs are relatively minimal, the required resources of the cloud service are manageable, and the smart devices 110 are available at least for a duration that the cloud service is to be used. In this exemplary implementation, the bid program 134 may process the bid information and determine a utility score that is toward one extreme of the utility score range. For example, the utility score may range from 0 to 1 where 1 is indicative of using the stateful deployment and 0 is indicative of using the stateless deployment. The utility score may also include a utility threshold set in a midpoint of the range (e.g., 0.5) although the threshold may be positioned anywhere along the range for various reasons (e.g., biasing the deployment towards one configuration over another, consideration of the types of bid information, etc.). Thus, in this exemplary implementation, the bid program 134 may determine the utility score to be above 0.5, closer to 1. Thus, based on the utility score alone that utilizes the costs and resources of the smart devices 110 in the coverage area, the stateful deployment may be determined for this scenario. In another exemplary implementation, the smart devices 110 may be substantially mobile and ephemeral in the coverage area such that the resources of each of the smart devices 110 are relatively unstable, the costs are varying, the required resources of the cloud service may or may not be manageable, and the smart devices 110 are available for indeterminate amounts of time that may or may not cover a duration that the cloud service is to be used. In this exemplary implementation, the bid program 134 may process the bid information and determine a utility score that is toward the other extreme of the utility score range. For example, the bid program 134 may determine the utility score to be below 0.5, closer to 0. Thus, based on the utility score alone that utilizes the costs and resources of the smart devices 110 in the coverage area, the stateless deployment may be determined for this scenario.

The bid program 134 may also determine how to sort the smart devices 110 in the coverage area based on the utility score and the bid information. For example, when the utility score is indicative of a stateful deployment, the bid program 134 may identify which of the smart devices 110 are to be associated with a pod for which individual storage operations are to be used. In another example, when the utility score is indicative of a stateless deployment, the bid program 134 may identify which of the smart devices 110 are to be associated with the various pods for which storage is shared for these pods.

In the exemplary embodiments, the coupling program 136 may be a software, hardware, and/or firmware application configured to determine whether two or more smart devices 110 may be considered as part of a set (e.g., coupling). The coupling program 136 may utilize the polling data and/or other available information (e.g., publicly available information such as on social media sites). The coupling program 136 may analyse the spatio-temporal social network relation between two or more users associated with the smart devices 110 and/or between two or more of the smart devices 110 themselves as to whether a given pair may be coupled or a plurality of smart devices 110 may be considered to be a set. For example, the coupling program 136 may receive information that a married couple is traveling together in the same vehicle and passing through the coverage area. The coupling program 136 may therefore determine that the smart devices 110 associated with the married couple may be coupled for purposes of the exemplary embodiments. In another example, the coupling program 136 may determine that a group of smart devices 110 are traveling together on a common transport (e.g., a sports team on a bus) such that these smart devices 110 may be coupled or grouped as a set for purposes of the exemplary embodiments.

The coupling program 136 may utilize coupling information as determined through the various analyses of the polling data to modify the utility score determined by the bid program 134. For example, the coupling program 136 may determine that a pair of smart devices 110 may be coupled. The coupling program 136 may subsequently determine that certain resources may be aggregated or otherwise considered to be grouped based on the coupling. In this manner, for the smart devices 110 that are coupled or grouped, the coupled or grouped smart devices 110 may have a coupled cost and/or coupled resource availability. In a particular example, the coupling program 136 may determine a possibility of saving resources by using a shared disk in kube-edges by the smart devices 110 that are coupled. In this manner, the coupling program 136 and/or the bid program 134 may utilize this updated cost and/or resource information of the smart devices 110 in the coverage area to re-evaluate the utility score as a modified utility score based on the coupling information. The modified utility score may be assessed relative to the utility threshold and a corresponding deployment type may be determined.

In the exemplary embodiments, the selecting program 138 may be a software, hardware, and/or firmware application configured to implement the determination of the deployment to be used in the kube-edge pod configuration. Using the modified utility score (e.g., when coupling information is available to update the utility score), the selecting program 138 may determine which deployment to utilize for the coverage area given the current conditions of the smart devices 110 that are present therein. As described above, the bid program 134 and/or the coupling program 136 may also determine the manner in which the smart devices 110 are to be sorted and/or assigned to perform operations for the cloud service 120. For example, for storage purposes, when a stateful deployment is to be used for the kube-edge pod configuration, select one or more of the smart devices 110 may be selected for the storage of data for a given pod (e.g., based on the cost and/or resource information of all present smart devices 110 in the coverage area). In another example, when a stateless deployment is to be used for the kube-edge pod configuration, select one or more of the smart devices 110 may be selected for the storage of data for a plurality of pods where storage is shared across the pods (e.g., based on the cost and/or resource information of all present smart devices 110 in the coverage area)

Figure 2:
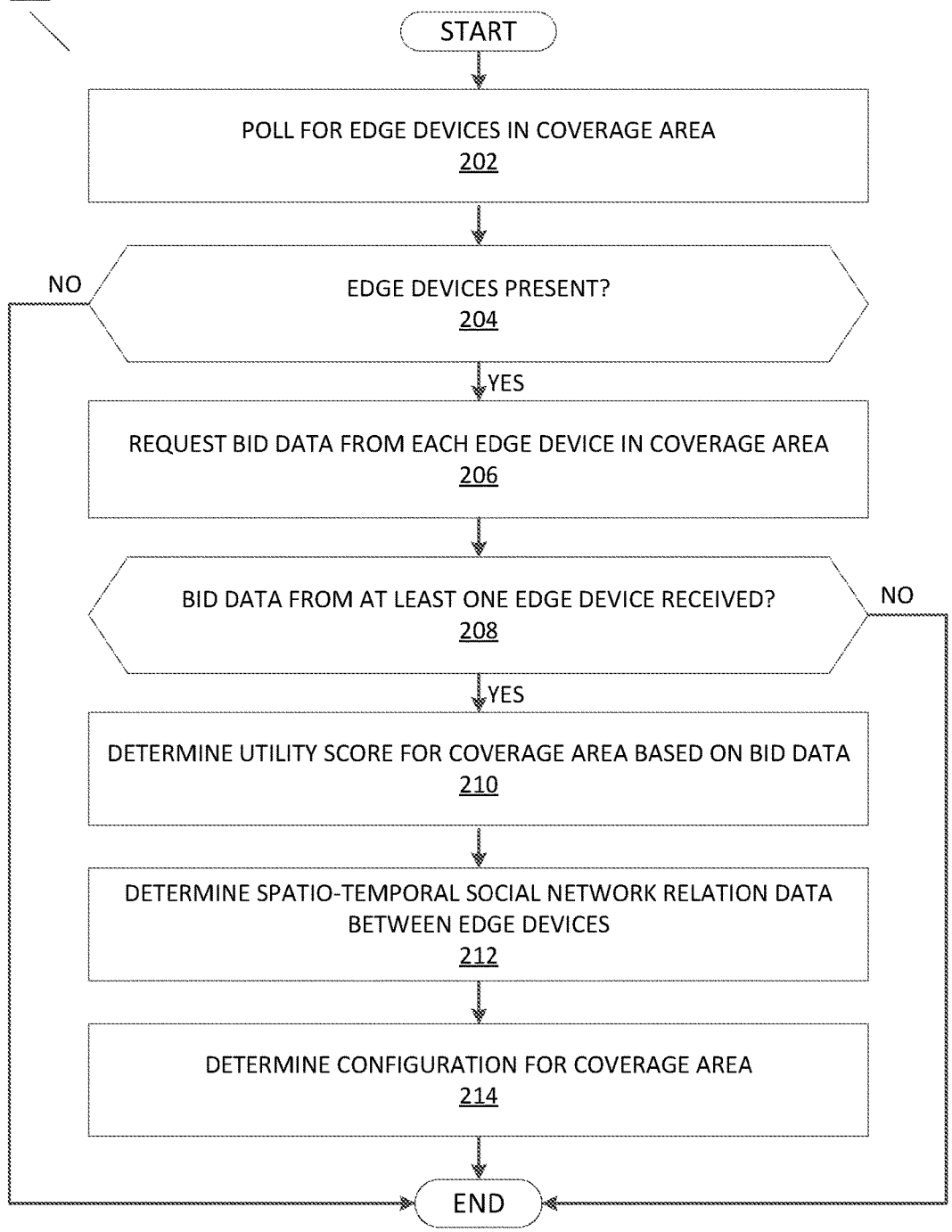
FIG. 2 depicts an exemplary flowchart of a method 200 illustrating the operations of the configuration server 130 of the kube-edge configuration system 100 in determining a kube-edge pod configuration, in accordance with the exemplary embodiments.

FIG. 2 depicts an exemplary flowchart of a method 200 illustrating the operations of the configuration server 130 of the kube-edge configuration system 100 in determining a kube-edge pod configuration, in accordance with the exemplary embodiments. The method 200 may relate to operations that are performed by the identification program 132, the bid program 134, the coupling program 136, and the selecting program 138 of the configuration server 130. Accordingly, the method 200 will be described from the perspective of the configuration server 130.

The configuration server 130 polls for devices in a coverage area (step 202). The configuration server 130 may poll for the smart devices 110 in a coverage in a variety of manners. In an exemplary implementation, the configuration server 130 may utilize an active approach in which the configuration server 130 selects the coverage area and broadcasts or transmits a polling signal for the selected coverage area. The smart devices 110 that are currently located in the coverage area and capable of receiving the polling signal may respond accordingly. In another exemplary implementation, the configuration server 130 may utilize a passive approach in which the configuration server 130 may be responsible for a coverage area and continuously broadcasts the polling signal and awaits responses from smart devices 110 that are in the coverage area. In a further exemplary implementation, the configuration server 130 may be configured with the active and the passive approach.

The configuration server 130 determines whether there are any devices present in the coverage area for which the kube-edge pod configuration is to be determined (decision 204). Based on the polling signal and the responses to the polling signal, the configuration server 130 may determine the presence of any of the smart devices 110 in the coverage area. As a result of there being no smart devices 110 in the coverage area (decision 204, "NO" branch), the configuration server 130 may utilize a default deployment. The default deployment may be a preselected deployment as selected by, for example, an administrator. The default deployment may also be dynamically selected based on historical deployments and selecting a more frequently used deployment.

As a result of there being at least one of the smart devices 110 in the coverage area (decision 204, "YES" branch), the configuration server 130 requests bid data from each device in coverage area (step 206). In the response to the polling signal, the configuration server 130 may receive polling data from the smart devices 110 in the coverage area. The polling data may include information about the smart devices 110 (e.g., availability information, location information, movement information, etc.) as well as bid information (e.g., information related to cost and/or resources of the smart devices 110).

The configuration server 130 determines whether bid information or whether the smart devices 110 are available for the kube-edge pod configuration (decision 208). As a result of the configuration server 130 not receiving bid data or determining that none of the smart devices 110 are available (decision 208, "NO" branch), the configuration server 130 may again defer to a default deployment.

As a result of the configuration server 130 receiving bid data and determining that at least one of the smart devices 110 are available (decision 208, "YES" branch), the configuration server 130 determines a utility score for the coverage area based on the bid information (step 210). With the bid information being indicative of the costs and resources of the smart devices 110 as well as the cloud service 120, the configuration server 130 may determine the utility score as an optimization analysis.

The configuration server 130 determines whether there are any spatio-temporal social network relation data between or among the smart devices 110 (step 212). Specifically, the configuration server 130 determines coupling information as to whether a pair of the smart devices 110 may be coupled or a plurality of the smart devices 110 may be considered a set. In coupling or grouping the smart devices 110, the costs and/or resources may be re-evaluated such that costs may be reduced or resources may be saved. For example, if the smart devices 110 may be coupled, a storage operation may be shared by the disks of the coupled smart devices 110. In this manner, the costs and/or resources of the smart devices 110 in the coverage area may be re-evaluated. Accordingly, the configuration server 130 may determine a modified utility score based on the utility score and the coupling information.

Using the modified utility score (e.g., when coupling information is available) or the utility score (e.g., when coupling information is unavailable), the configuration server 130 determines a configuration to be used for coverage area (step 214). Specifically, the configuration server 130 may determine whether the kube-edge pod configuration is to be stateful where storage is individual for each pod or stateless where storage is shared across the pods, the storage in either deployment being through one or more of the smart devices 110. The configuration server 130 may also determine how to provide the selected kube-edge pod configuration deployment by determining which of the smart devices 110 are to be used for the storage functionality.

The exemplary embodiments are configured to determine a kube-edge pod configuration for a coverage area of a mobile environment in which one or more mobile devices may be present. As mobile environments entail dynamic conditions with mobile devices entering and exiting the coverage area as well as each mobile device having dynamic costs and resources associated therewith in being an edge device, the exemplary embodiments dynamically determine the kube-edge pod configuration through a selection between a stateful deployment or a stateless deployment based on the existing conditions of the coverage area.

According to various features, the exemplary embodiments leverage spatio-temporal social network analysis in the context of multi-device availability for discovering and enabling a best kube-edge pod configuration for a given mobile environment which enables high coverage and availability with minimal incentives. The exemplary embodiments also leverage mobility patterns of mobile nodes and their communication interaction with peer nodes so as to generate service-level-objective conforming kube-edge pod configurations which span the spectrum of stateless-to-stateful options. The exemplary embodiments further consider standard parameters with respect to resource and cost as well as understand a potential to couple or group devices based on spatio-temporal social network analysis which is leveraged to better trade-off between stateful vs stateless in kube-edges leading to better trade-off decisions.

Figure 3:
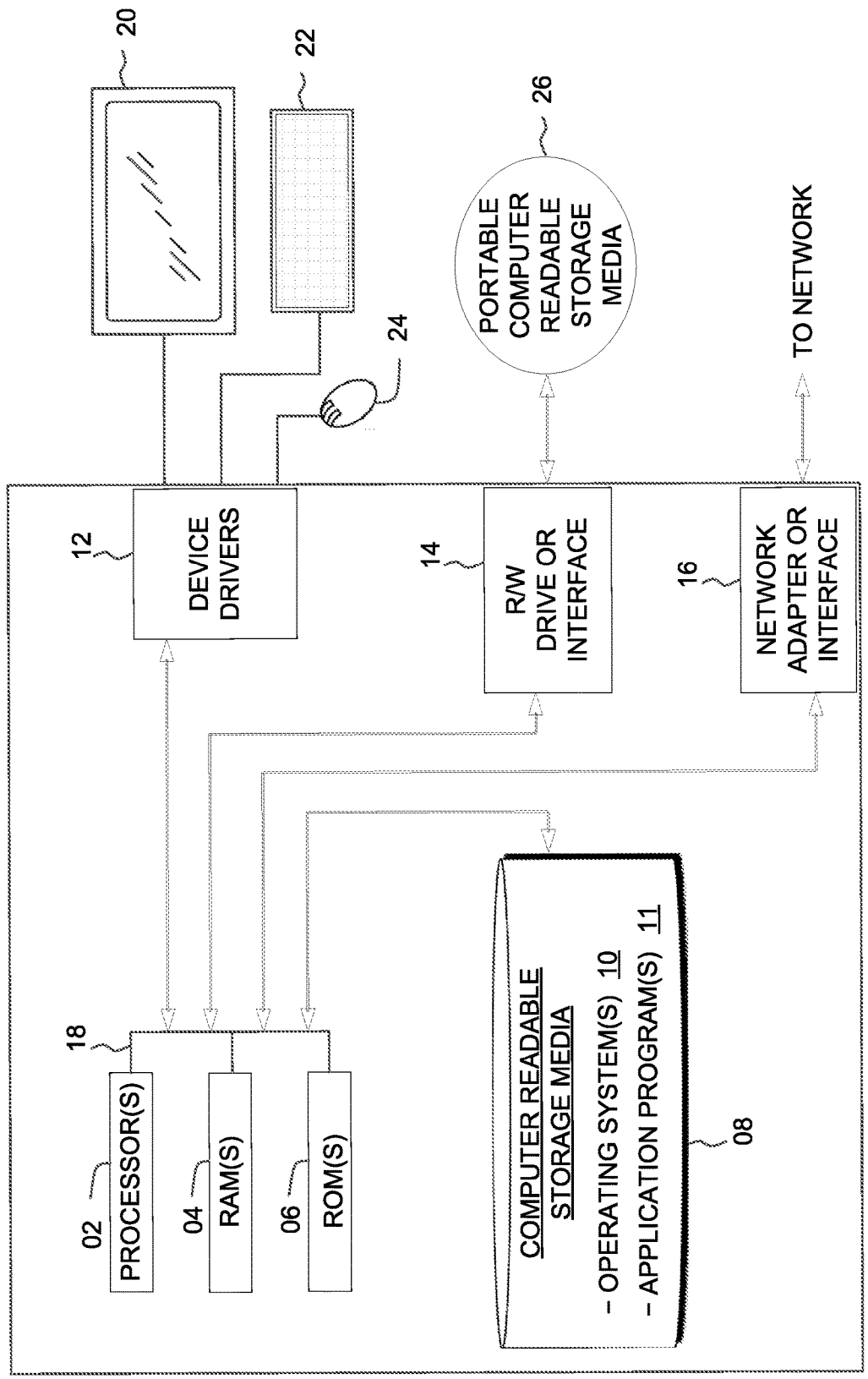
FIG. 3 depicts an exemplary block diagram depicting the hardware components of the kube-edge configuration system 100 of FIG. 1, in accordance with the exemplary embodiments.

FIG. 3 depicts a block diagram of devices within the kube-edge configuration system 100 of FIG. 1, in accordance with the exemplary embodiments. It should be appreciated that FIG. 3 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, RAY drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
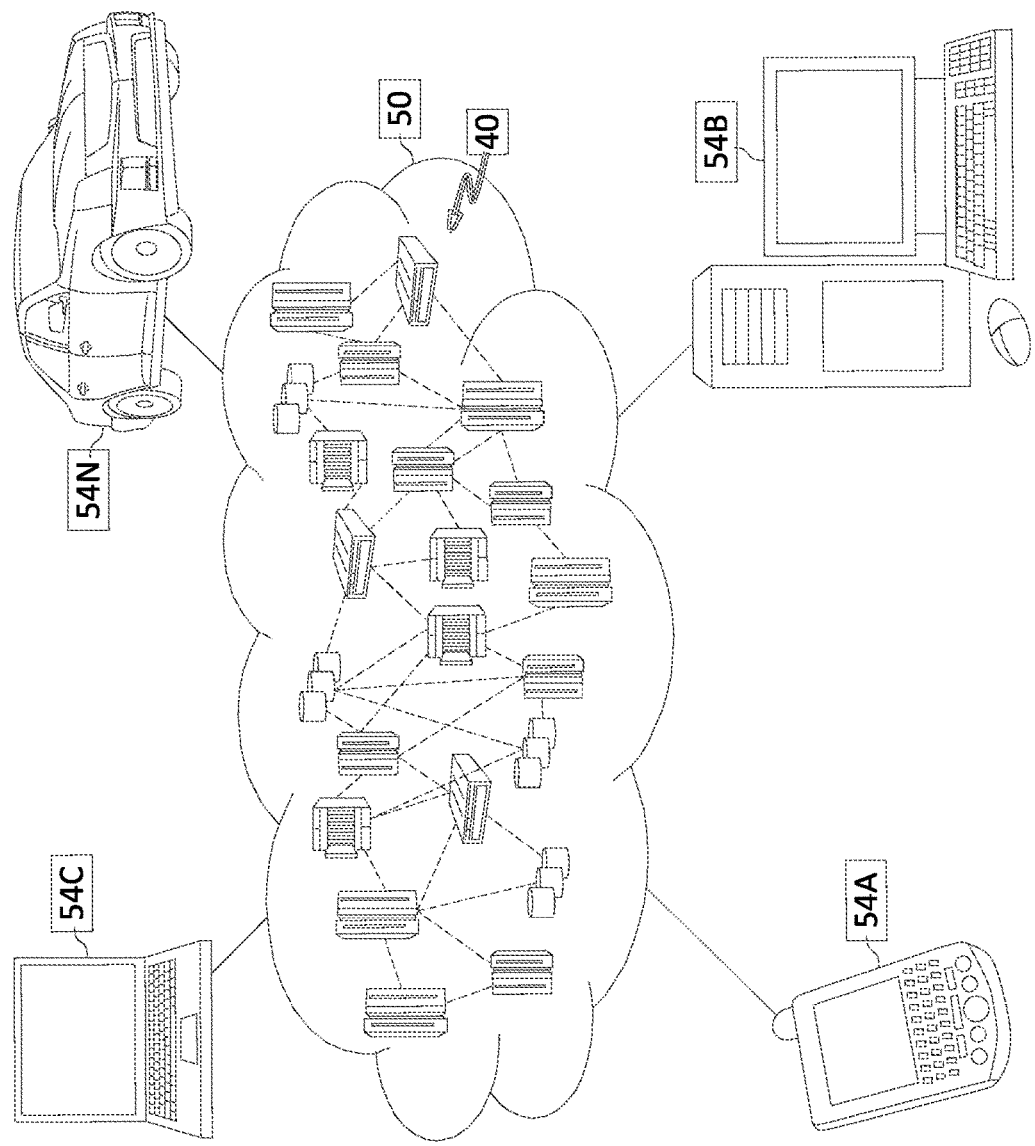
FIG. 4 depicts a cloud computing environment, in accordance with the exemplary embodiments.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
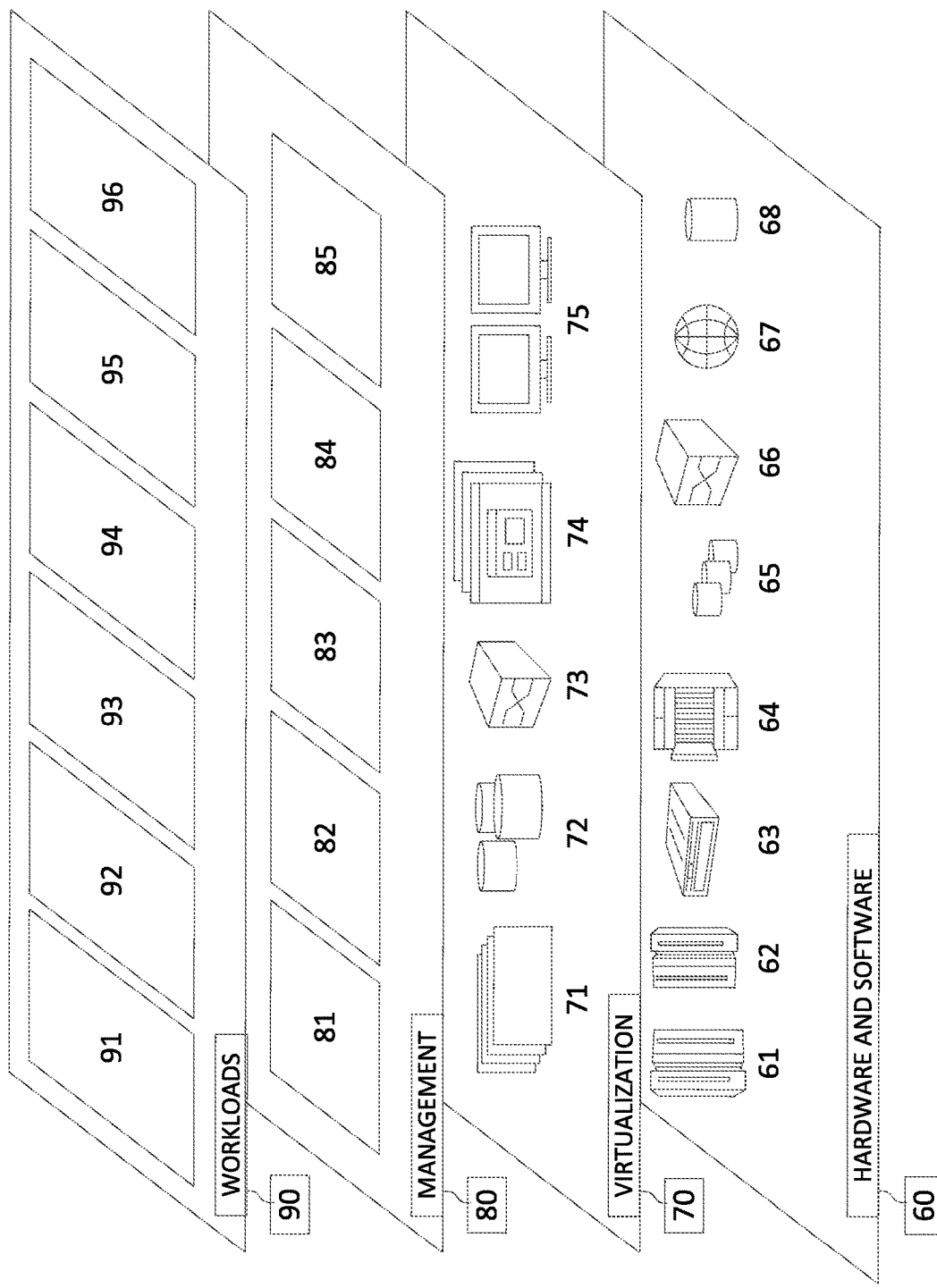
FIG. 5 depicts abstraction model layers, in accordance with the exemplary embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and kube-edge configuration processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for determining a kube-edge pod configuration, the method comprising:
   determining mobile devices in a coverage area of a mobile environment, the mobile devices utilizing a cloud service;
   receiving polling data from the mobile devices, the polling data including bid data indicative of a respective cost and a respective resource availability for each of the mobile devices operating as an edge device for the cloud service;
   determining coupling information for the mobile devices, the coupling information indicative of whether at least two of the mobile devices are to be considered coupled such that the coupled mobile devices have a coupled cost and a coupled resource availability in providing a data storage functionality shared across the coupled mobile devices by aggregating available storage of the coupled mobile devices;
   as a result of the at least two of the mobile devices being coupled, determining a utility score of the coverage area based on the bid data and the coupling information, the utility score incorporating the coupled cost associated with the at least two of the mobile devices being coupled; and
   determining a data storage deployment scheme for pods of the cloud service based on the utility score where:
      as a result of the utility score having a first result relative to a utility threshold, selecting a stateless data storage deployment scheme configuring the storage to be shared across the pods, and
      as a result of the utility score having a second result relative to the utility threshold, selecting a stateful data storage deployment scheme configuring the storage to be individual for each of the pods.

2. The computer-implemented method of claim 1, wherein the polling data further includes characteristic information of the mobile devices, the characteristic information including at least one of availability information, location information, movement information, and technical parameters for each of the mobile devices.

3. The computer-implemented method of claim 1, wherein the bid data includes information directed toward at least one of mobile resource availability, cost in being the edge device, resources required for the cloud service, and a mobile availability time.

4. The computer-implemented method of claim 1, wherein the coupling information is based on spatio-temporal social network relation data of at least one of the mobile devices and users associated with the mobile devices.

5. The computer-implemented method of claim 1, wherein determining the mobile devices in the coverage area comprises:
   broadcasting a polling signal in the coverage area,
   wherein receiving the polling data from the mobile devices is a result of the mobile devices transmitting the polling data upon receiving the polling signal.

6. The computer-implemented method of claim 1, wherein determining the mobile devices in the coverage area comprises:
   selecting the coverage area; and
   transmitting a polling signal to the mobile devices in the coverage area,
   wherein the polling data is from the mobile devices receiving the polling signal.

7. A computer program product for determining a kube-edge pod configuration, the computer program product comprising:
   one or more non-transitory computer-readable storage media and program instructions stored on the one or more non-transitory computer-readable storage media capable of performing a method, the method comprising:
      determining mobile devices in a coverage area of a mobile environment, the mobile devices utilizing a cloud service;
      receiving polling data from the mobile devices, the polling data including bid data indicative of a respective cost and a respective resource availability for each of the mobile devices operating as an edge device for the cloud service;
      determining coupling information for the mobile devices, the coupling information indicative of whether at least two of the mobile devices are to be considered coupled such that the coupled mobile devices have a coupled cost and a coupled resource availability in providing a data storage functionality shared across the coupled mobile devices by aggregating available storage of the coupled mobile devices;

as a result of the at least two of the mobile devices being coupled, determining a utility score of the coverage area based on the bid data and the coupling information, the utility score incorporating the coupled cost associated with the at least two of the mobile devices being coupled; and determining a data storage deployment scheme for pods of the cloud service based on the utility score where:
  as a result of the utility score having a first result relative to a utility threshold, selecting a stateless data storage deployment scheme configuring the storage to be shared across the pods, and
  as a result of the utility score having a second result relative to the utility threshold, selecting a stateful data storage deployment scheme configuring the storage to be individual for each of the pods.

8. The computer program product of claim 7, wherein the polling data further includes characteristic information of the mobile devices, the characteristic information including at least one of availability information, location information, movement information, and technical parameters for each of the mobile devices.

9. The computer program product of claim 7, wherein the bid data includes information directed toward at least one of mobile resource availability, cost in being the edge device, resources required for the cloud service, and a mobile availability time.

10. The computer program product of claim 7, wherein the coupling information is based on spatio-temporal social network relation data of at least one of the mobile devices and users associated with the mobile devices.

11. The computer program product of claim 7, wherein determining the mobile devices in the coverage area comprises:
  broadcasting a polling signal in the coverage area,
    wherein receiving the polling data from the mobile devices is a result of the mobile devices transmitting the polling data upon receiving the polling signal.

12. The computer program product of claim 7, wherein determining the mobile devices in the coverage area comprises:
  selecting the coverage area; and
  transmitting a polling signal to the mobile devices in the coverage area,
    wherein the polling data is from the mobile devices receiving the polling signal.

13. A computer system for determining a kube-edge pod configuration, the computer system comprising:
  one or more computer processors, one or more computer-readable storage media, and program instructions stored on the one or more of the computer-readable storage media for execution by at least one of the one or more processors capable of performing a method, the method comprising:
    determining mobile devices in a coverage area of a mobile environment, the mobile devices utilizing a cloud service;
    receiving polling data from the mobile devices, the polling data including bid data indicative of a respective cost and a respective resource availability for each of the mobile devices operating as an edge device for the cloud service;
    determining coupling information for the mobile devices, the coupling information indicative of whether at least two of the mobile devices are to be considered coupled such that the coupled mobile devices have a coupled cost and a coupled resource availability in providing a data storage functionality shared across the coupled mobile devices by aggregating available storage of the coupled mobile devices;
    as a result of the at least two of the mobile devices being coupled, determining a utility score of the coverage area based on the bid data and the coupling information, the utility score incorporating the coupled cost associated with the at least two of the mobile devices being coupled; and
    determining a data storage deployment scheme for pods of the cloud service based on the utility score where:
      as a result of the utility score having a first result relative to a utility threshold, selecting a stateless data storage deployment scheme configuring the storage to be shared across the pods, and
      as a result of the utility score having a second result relative to the utility threshold, selecting a stateful data storage deployment scheme configuring the storage to be individual for each of the pods.

14. The computer system of claim 13, wherein the polling data further includes characteristic information of the mobile devices, the characteristic information including at least one of availability information, location information, movement information, and technical parameters for each of the mobile devices.

15. The computer system of claim 13, wherein the bid data includes information directed toward at least one of mobile resource availability, cost in being the edge device, resources required for the cloud service, and a mobile availability time.

16. The computer system of claim 13, wherein the coupling information is based on spatio-temporal social network relation data of at least one of the mobile devices and users associated with the mobile devices.

17. The computer system of claim 13, wherein determining the mobile devices in the coverage area comprises:
  broadcasting a polling signal in the coverage area,
    wherein receiving the polling data from the mobile devices is a result of the mobile devices transmitting the polling data upon receiving the polling signal.

18. The computer system of claim 13, wherein determining the mobile devices in the coverage area comprises:
  selecting the coverage area; and
  transmitting a polling signal to the mobile devices in the coverage area,
    wherein the polling data is from the mobile devices receiving the polling signal.

* * * * *